G. PIERCE.
Domestic Oven.
No. 14,828.
Patented May 6, 1856.
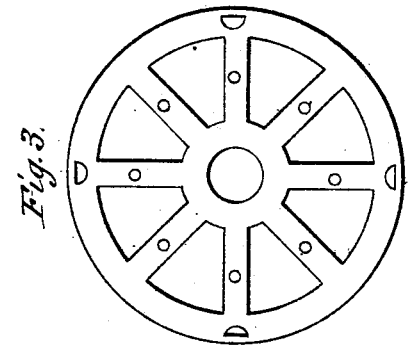
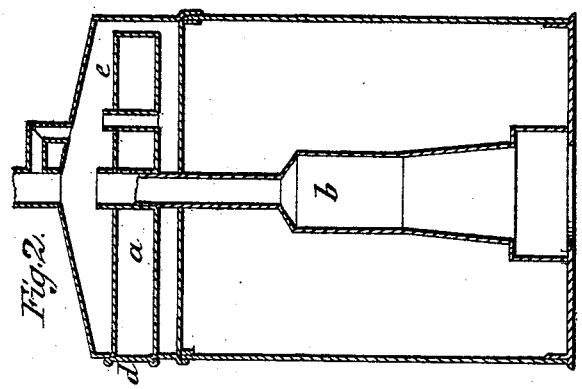
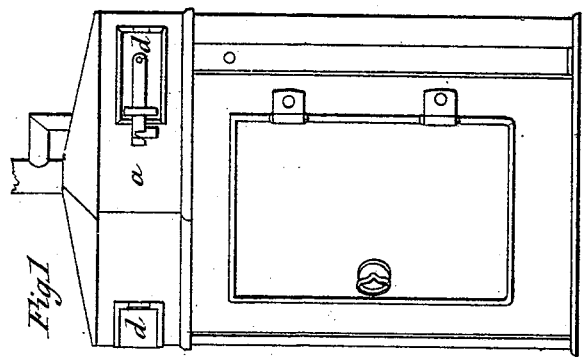

UNITED STATES PATENT OFFICE.

GEORGE PIERCE, OF NEW YORK, N. Y.

COOKING APPARATUS.

Specification of Letters Patent No. 14,828, dated May 6, 1856.

*To all whom it may concern:*

Be it known that I, GEORGE PIERCE, of the city, county, and State of New York, have invented a certain new and useful Improvement in Cooking Apparatus; and I do hereby declare the following to be a description thereof ascertaining the same, reference being had to the accompanying drawing, in which—

Figure 1, is an elevation; Fig. 2, a section. Fig. 3, plan of the top of the roaster.

In the apparatus patented by Samuel Peam on the twelfth day of July, 1838, there was no provision for an oven or place for baking, heating, &c., a want very much felt where no other fire was required than to roast by—and much heat radiated from the top thereof that was wholly wasted. I avail myself of this state of facts to place an oven on said roaster perfectly available and completing the apparatus without increasing the diameter thereof or decreasing its efficiency in any way.

The construction is as follows: *a* represents the roaster on the plan of the patent being a cylindrical tin case surrounding a stove *b* in the center. The top of this roaster I make flat and pass the pipe from the stove directly up through it. This flat top is made with openings in it as seen at Fig. 3. Above this I place an oven with a single bottom and double sides and top, the latter having considerable space between the outer and inner surfaces and the side spaces being open all around below connecting thereby with the interior of the roaster as will be clearly illustrated by the drawing. The smoke pipe from the stove passes up directly through the oven which is by these several means perfectly heated. Doors *d* are made at proper intervals around the sides of the oven which divide the spaces in the sides into three, more or less, and a tube for the gases evolved in cooking passes up through the oven at *e* and thence above the top into the smoke pipe.

I by combining this device with the roaster employ the top radiating heat for the purposes of baking and thus economize fuel and improve the apparatus.

Having thus fully described my improvement of cooking apparatus what I claim therein as new, and for which I desire to secure Letters Patent is—

The employment of the double oven arranged and combined with the roasting apparatus substantially as herein set forth and for the purposes described.

GEORGE PIERCE.

Witnesses:
J. C. GREENOUGH,
J. J. SAVAGE.